Jan. 8, 1957　　　　H. R. BURT　　　　2,776,597

LENS CAPSULE AND LENS MOUNTING ASSEMBLY

Filed July 29, 1955

INVENTOR,
HAROLD R. BURT

BY

Buckhorn and Cheatham

ATTORNEYS

United States Patent Office 2,776,597
Patented Jan. 8, 1957

2,776,597

LENS CAPSULE AND LENS MOUNTING ASSEMBLY

Harold R. Burt, Portland, Oreg., assignor to Sawyer's Inc., Portland, Oreg., a corporation of Oregon Application July 29, 1955, Serial No. 525,289

9 Claims. (Cl. 88—57)

The present invention relates to an improvement in optical apparatus, particularly in regard to the means for mounting lenses therein.

Optical apparatus of a wide variety of types and purposes employs lenses made of glass. Great care, including precision grinding of even the nonoptical surfaces of the lenses and precision machining of the lens holding elements, has heretofore been considered necessary for accurately positioning the lenses in optical instruments. It has, therefore, not been possible to provide low cost optical instruments of high precision even though glass lenses having accurate optical surfaces can be inexpensively produced. The present invention, however, provides an inexpensive lens mounting by which one or more lenses may be rapidly installed so as to be accurately positioned in an optical instrument, such mounting being capable of receiving and holding lenses in accurate position even though the lenses vary in diameter or thickness or both within considerable limits and such mounting also lending itself to employing, in stereoscopic devices, lenses having certain defects ordinarily rendering them unsuitable for such devices. While the present invention has been developed primarily for mounting glass lenses it will become apparent that the same principles may be employed for mounting lenses of softer materials such as certain transparent plastics.

The object of the present invention is to provide lens mounting means making possible the provision of low cost optical instruments of high precision.

A further object of the present invention is to provide optical instruments with lens mounting means in which the lenses are positively retained in correct optical position.

A further object of the present invention is to provide means for correctly seating lenses in an optical instrument without requiring precision fitting of the lens and its mount.

The foregoing and other objects and advantages of the present invention will be more readily apparent from inspection of the following specification, taken in connection with the accompanying drawings, wherein a preferred embodiment of the present invention is illustrated in association with a typical instrument in which the present invention may be utilized.

Figure 1:
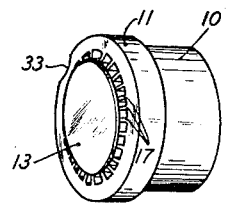
Fig. 1 is a perspective view of a lens capsule embodying the present invention.

A lens capsule, in accordance with the present invention, comprises a lens mounting member, in this instance a cylindrical, tubular body 10 having a flange 11 at one end and a bore 12 therethrough from end to end. In the particular apparatus, a pair of lenses 13 are mounted in the mounting member, one at each end, but it is to be appreciated that the invention may be utilized for the mounting of a single lens. Each lens is retained in a lens seating recess 14 defined by a cylindrical wall 15 and an annular seating ledge 16.

The lens of the preferred embodiment of the invention is formed of glass and the mounting member may be formed of any suitable solid material having substantially less hardness than the lens and having substantial resiliency, such as any one of several thermoplastic resins, a particularly suitable material being high impact polystyrene which is a relatively soft but tough material having high resiliency. The lens is retained in its seat by a plurality of closely spaced, axially extending fins 17 which are narrow relative to their axial length. In the specific example illustrated, the fins 17 are several hundredths of an inch in radial extent, and their inner edges lie along a concentric circle of lesser diameter than the inner diameter of the seating ledge. The axial edges of the fins are approximately 15/100 of an inch in width, but may vary in width depending upon the nature of the material employed. The diameter of the circle defined by the edges of the fins is approximately 0.749 inch, and the lens 13 is specified to have a maximum diameter of 0.757 inch with an allowable minimum variation down to 0.751 inch. Thus, the lenses may vary in diameter from 2/1000 of an inch to 8/1000 of an inch greater than the circle defined by the fins. Thus, when the lens is in position, the edges of the fins resiliently yield in a radial direction a distance ranging from 1/1000 of an inch to 4/1000 of an inch. The positioning of the lens is achieved by placing the lens in substantial coaxial alignment with the lens mounting member and applying axial pressure to force the two together by means permitting radial movement of one with respect to the other. It will be noted that the ends of the fins 17 remote from the seating ledge 16 are beveled or chamfered so as to guide the lens into proper coaxial alignment with the lens mounting member. The lens may, therefore, be placed rapidly on the lens mounting member and pressed into its permanent position. It will readily be apparent that lenses may be employed which have considerable variations in diameter. This eliminates any necessity for grinding the periphery of the lenses to absolute tolerances, or matching lenses of varying diameter to lens holding members having lens seats with side walls of varying diameters.

The thickness of the lenses can also vary within considerable limits, thus reducing the care required in producing the lenses. In the specific example illustrated the most critical factor is the distance between the convex surfaces of the two lenses 13 and this distance is set by the distance between the annular seating ledges 16, which distance will be accurately determined for optical reasons. The lens engaging edge of the seating ledges are preferably appropriately shaped to fit the curvature of the lenses and in order to insure that lenses seat on the ledges, the lenses are preferably of sufficient thickness to project a small amount from the ends of the body 10 as shown most clearly in Fig. 2. This enables the lens to be more easily positioned in the capsule and also enables the lens carrying capsule to be more easily positioned in an optical instrument than would be the case if the lenses were of less thickness than the depths of the lens receiving recesses to the seating edges of the ledges 16.

Figure 4:
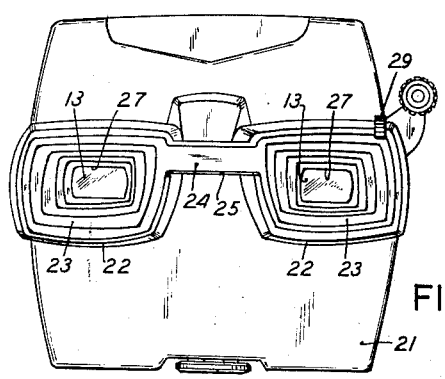
Fig. 4 is a front view of a stereoscope constructed in accordance with the present invention.
Figures 5, 6:
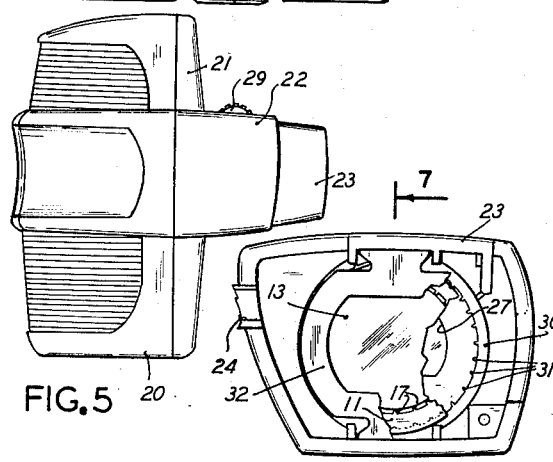
Fig. 5 is a side view of Fig. 4.
Fig. 6 is a fragmentary, rear view of a portion of an eyepiece part of the stereoscope as indicated by the line 6—6 of Fig. 7.

A further advantage results from this construction. In the large scale grinding of lenses having spherical surfaces it may occur that a substantial number of the lenses have their optical centers eccentrically disposed with respect to their geometrical centers so that one edge of such a lens is thinner than the other and there is a prism or wedge effect producing a bending of all of the light in the same direction. If the defect is not great this may be of no consequence in apparatus having a single optical system. However, in apparatus employing a stereoscopic arrangement of lenses, such as illustrated in Figs. 4 and 5, deleterious eyestrain may result unless corresponding rays of light passing through the two lens systems remain parallel to each other. In the present invention this result may be easily and rapidly achieved by marking the radial direction of eccentricity of the optical center with respect to the geometric center in an instrument designed for that purpose, matching pairs of lenses having substantially the same degree of eccentricity, and forcing them into the same ends of the two lens mounting capsules to be employed in the same stereoscopic instrument with the marks in proper relation to indexes on such capsules. Such capsules are then mounted in the optical instrument with such indexes extending in the same radial direction on both capsules.

Figure 3:
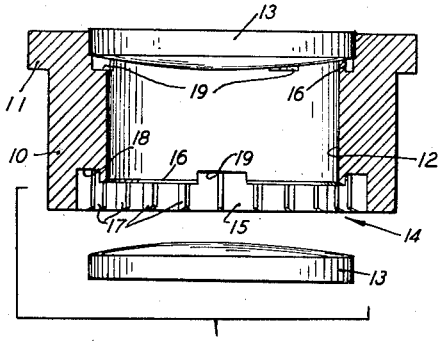
Fig. 3 is a horizontal section through the lens capsule, taken along line 3—3 of Fig. 2 and showing one lens disassociated from the capsule.
Figure 7:
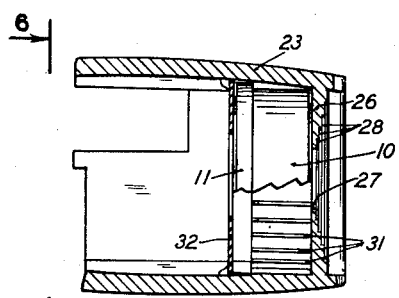
Fig. 7 is a vertical section taken along line 7—7 of Fig. 6.

A further feature of the present invention is illustrated most clearly in Fig. 3 wherein it is seen that the seating ledge 16 comprises an axially extending inner wall defining a trough 18 which is of greater width than the radial extent of the fins 17. This inner wall is interrupted or recessed at several points, such as indicated at 19. Therefore, air may circulate around the periphery of the lens and through the recesses 19 to prevent the accumulation of moisture between a pair of lenses. The openings thus defined are so small that lint and dust are prevented from entering.

Figure 2:
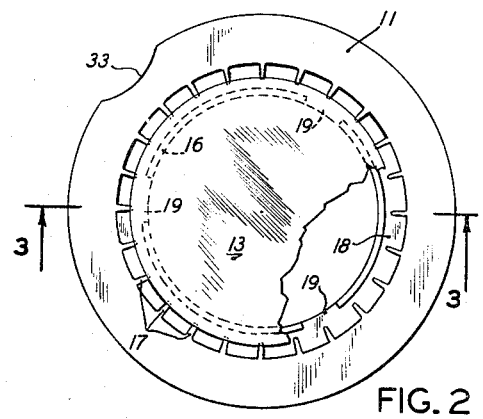
Fig. 2 is a front view of the lens capsule, on an enlarged scale.

An optical instrument in which the present invention is embodied is illustrated in Figs. 4 to 7, inclusive, the same comprising an adjustable focus stereoscope for viewing stereo-paired transparencies mounted in a disc holder such as disclosed in the patent to Kurz 2,571,584, issued October 16, 1951. The stereoscope herein illustrated comprises a body including a rear portion 20 and a front portion 21, each molded of suitable material such as a cast alloy of metals or a moulded thermoset phenolformaldehyde resin, such as Bakelite. The front portion 21 is formed with a pair of tubular eyepiece guides 22 in which a pair of eyepieces 23 are slidably guided for fore and aft movement. The eyepiece mounts 23 are rigidly connected together by a bridge 24 extending laterally through a slot 25 in the front wall of the member 21 and the adjacent sidewalls of the eyepiece guides. A lens capsule, as illustrated in Figs. 1 to 3, is mounted in each of the eyepiece mounts. The forward lens of the lens capsule is pressed against the forward wall 26 of the eyepiece mount (Fig. 7) so that one surface of a lens 13 is in engagement with such wall, the lens being partially visible through a substantially rectangular window 27 in the forward wall. The forward wall 26 is provided with a plurality of decorative steps 28, which tend to draw the eye toward the window when first moving the stereoscope into viewing position. A focus adjusting knob 29 projects through one of the eyepiece guides 22 and is accessible for manual engagement whereby to focus the instrument by fore and aft movement of the lens mounting means through internal mechanism (not herein illustrated).

The interior of each of the eyepiece mounts 23 is provided with a cylindrical wall 30 defining a socket of sufficient depth to receive the lens mounting member 10. A plurality of axially extending fins 31 project radially inward from the inner surface of the wall 30, such fins being similar to the fins 17 in the lens mounting member.

In a manner similar to the fins 17, the fins 31 define a circle several thousandths of an inch smaller than the external diameter of the lens mounting member. In this case, however, the fins are harder than the lens mounting member whereby they will press into and securely retain the lens capsule in position. A sheet metal mask 32 is frictionally retained against the inner lens, as illustrated.

For greatest precision the flange 11 on the lens capsule may be provided with an index notch 33, which is registered with an index boss on the interior of the eyepiece mounting member 23 (not shown). For greatest accuracy, matched sets of lens capsules may be employed as described above, i. e., those having lenses with substantially equal eccentricities of optical centers with respect to geometric centers, and with their optical centers radially displaced in the same direction with respect to indexes on the capsules and preferably radially aligned with the index notches 31.

While lens systems having glass lenses and lens holders or capsules of softer material having substantial resilience have been described, it is entirely possible to employ lenses of transparent plastic material such, for example, as clear polyethylene and lens mounting or capsules of harder material such as cast metal or substantially rigid molded thermosetting resin, such that the fins 17 press into the periphery of the lenses to hold them accurately in position, and such lens mounting may be either of material softer than the material of the ribs 31 of the eyepiece mounts so that such ribs press into the periphery of the lens mounting or of material harder than the ribs 31 so that the ribs resiliently yield to secure the lens mount in position. The preferred structure is that specifically shown and described in which the lens mount is of softer material than either the lens or the eyepiece mount, but the important consideration is that, in either case, one of the members secured together should be of resilient material which is softer than the other.

Having illustrated and described a preferrd embodiment of the present invention, it should be apparent to those skilled in the art that the same permits of modification in arrangement and detail. I claim as my invention all such modifications as come within the true spirit and scope of the appended claims.

I claim:

1. A lens capsule comprising a lens mounting member having a lens seating recess therein defined by a cylindrical wall and an annular seating ledge, a lens in the form of a disc member seated in said recess, said wall being of greater diameter than said lens, and a plurality of closely spaced, axially extending fins protruding radially inwardly from said wall with their inner edges lying along a circle of greater diameter than the inner diameter of said annular ledge, one of said members being formed of a material softer than the material from which the other is formed and having substantial resilience, said fins being narrow relative to their axial length and the inner edges of said fins having yielding engagement with the peripheral surface of said lens.

2. A lens capsule comprising a lens mounting member having a lens seating recess therein defined by a cylindrical wall and an annular seating ledge, a glass lens in the form of a disc member seated in said recess, said wall being of greater diameter than said lens, and a plurality of closely spaced, axially extending fins protruding radially inwardly from said wall with their inner edges lying along a circle of greater diameter than the inner diameter of said annular ledge, said fins being narrow relative to their axial length and said lens mounting member being formed of material softer than said glass lens and having substantial resilience so that the inner edges of said fins have yielding engagement with the peripheral surface of said lens.

3. A lens capsule comprising a lens mounting member having a coaxial pair of recesses opening outwardly at the opposite ends of a bore therethrough, each of said recesses being defined by a cylindrical wall and an annular seating ledge, a pair of disc lenses seated respectively in said recesses, the walls of said recesses being of larger diameter than the lens seated therein, and a plurality of integral, closely spaced, narrow, axially extending fins protruding radially inwardly from each of said walls with their inner edges lying along concentric circles of greater diameter than the inner diameter of the adjacent seating ledge, said lens mounting member being formed of a material of lesser hardness than said lenses, said fins in said recesses having their inner edges in yielding engagement with the peripheries of said lenses.

4. The structure set forth in claim 3 wherein each of said ledges is interrupted to provide notches whereby air may circulate through said capsule.

5. An optical instrument including a lens capsule comprising a lens mounting member having a lens seating recess therein defined by a cylindrical wall and an annular seating ledge, a lens in the form of a disc member seated in said recess, said wall being of greater diameter than said lens, a plurality of closely spaced, narrow, axially extending fins protruding radially inwardly from said wall with their inner edges lying along a circle of greater diameter than the inner diameter of said annular ledge, one of said members being formed of a material softer than the material from which the other is formed and having substantial resiliency, the inner edges of said fins having yielding engagement with the periphery of said lens, an eyepiece mounting member having a cylindrical wall therein, said cylindrical wall having a plurality of integral, closely spaced, narrow axially extending fins protruding radially inwardly therefrom with their inner edges lying along a circle, said lens mounting member comprising a cylindrical body retained within the cylindrical wall of said eyepiece mounting member, one of said eyepiece mounting members and lens mounting members being formed of a material softer than the material from which the other is formed and having substantial resilience, the fins of said eyepiece mounting member having yielding engagement with the periphery of said lens mounting member.

6. The structure set forth in claim 5 in which the lens mounting member is of softer material than said lens and of softer material than said eyepiece mounting member.

7. An optical instrument comprising an eyepiece mounting member having a cylindrical wall therein, said cylindrical wall having a plurality of integral, closely spaced, axially extending fins protruding radially inwardly therefrom with their inner edges lying along a circle, a lens capsule comprising a cylindrical body retained within said wall, said cylindrical body being formed of a material of lesser hardness than said fins, and said fins being narrow relative to their axial length and having their inner edges in yielding engagement with the peripheral surface of said body.

8. An optical instrument comprising a glass lens, and a mounting member for said lens having a lens seating recess therein, said recess comprising a lens-surrounding wall having a plurality of integral, closely spaced, axially extending fins protruding radially inward therefrom, the material of said lens mounting member being softer than the material of said lens, and each of said fins being narrow relative to its axial length and being in yielding engagement with the peripheral surface of said lens to an equal extent.

9. Means for mounting a lens in an optical instrument comprising a pair of members having cylindrical walls concentrically retained one within the other in spaced relation to each other, one of said members being harder than the other and having a plurality of integral, closely spaced, axially extending fins protruding radially from its cylindrical wall with their extremities defining a circle concentric with the cylindrical wall of said one member, said fins being narrow relative to their axial length and the extremities of said fins being in yielding engagement with the cylindrical wall of the other of said members.

References Cited in the file of this patent

UNITED STATES PATENTS

| Number | Name | Date |
|---|---|---|
| 786,052 | Roebuck | Mar. 28, 1905 |
| 859,215 | Guilbert | July 9, 1907 |
| 1,417,326 | Jacobson | May 23, 1922 |
| 2,203,660 | Young | June 4, 1940 |
| 2,212,123 | Neil et al. | Aug. 20, 1940 |
| 2,266,169 | Crumrine | Dec. 16, 1941 |
| 2,388,051 | Guellich | Oct. 30, 1945 |
| 2,431,238 | Friedman | Nov. 18, 1947 |
| 2,465,083 | Gradisar | Mar. 22, 1949 |